(12) United States Patent
Michaeli et al.

(10) Patent No.: US 11,679,841 B2
(45) Date of Patent: Jun. 20, 2023

(54) MARINE VESSEL WITH AFT EXTENSION

(71) Applicant: Ockerman Automation Consulting, Inc., Anacortes, WA (US)

(72) Inventors: Jennifer Michaeli, Smithfield, VA (US); Robert Walling, Pine Beach, NJ (US); Alden Nelson, Norfolk, VA (US); Mark Hoover, Virginia Beach, VA (US)

(73) Assignee: Ockerman Automation Consulting, Inc., Anacortes, WA (US)

( * ) Notice: Subject to any disclaimer, the term of this patent is extended or adjusted under 35 U.S.C. 154(b) by 86 days.

(21) Appl. No.: 16/988,218

(22) Filed: Aug. 7, 2020

(65) Prior Publication Data

US 2021/0291934 A1 Sep. 23, 2021

Related U.S. Application Data

(60) Provisional application No. 62/992,822, filed on Mar. 20, 2020.

(51) Int. Cl.
*B63B 1/08* (2006.01)
*B63B 3/14* (2006.01)
*B63B 7/00* (2020.01)
*B63B 1/22* (2006.01)

(52) U.S. Cl.
CPC ............ *B63B 1/08* (2013.01); *B63B 1/22* (2013.01); *B63B 3/14* (2013.01); *B63B 7/00* (2013.01)

(58) Field of Classification Search
CPC ....... B63B 2001/045; B63B 1/08; B63B 1/16; B63B 1/18; B63B 1/22; B63B 3/14; B63B 3/40; B63B 2003/485; B63B 3/54; B63B 7/00; B63B 2007/065; Y02T 70/10
See application file for complete search history.

(56) References Cited

U.S. PATENT DOCUMENTS

| 3,508,510 | A | * | 4/1970 | Frankel | ................... B63B 35/40 |
| | | | | | 114/260 |
| 3,877,095 | A | | 4/1975 | Ivy | |
| 5,572,944 | A | | 11/1996 | Slikkers et al. | |
| 7,178,474 | B2 | | 2/2007 | Warnes | |

(Continued)

OTHER PUBLICATIONS

International Search Report and Written Opinion for PCT Application No. PCT/US2021/023261, dated Jun. 10, 2021.

*Primary Examiner* — Ajay Vasudeva
(74) *Attorney, Agent, or Firm* — Dorsey & Whitney LLP

(57) ABSTRACT

A marine vessel or watercraft may be provided with an aft extension that, in one configuration of the watercraft, alters the wake of the watercraft, for example by reducing the height of the wake, and which may include a sealable opening to provide crew or payload access into or out of the watercraft at a location (e.g., aft of the transom) that may be difficult for an observer to perceive. The aft extension may be positioned above the watercraft's waterline when the watercraft is in another configuration such that it does not contact with the water to reduce adverse impact on performance characteristics, such as drag, of the hull when the watercraft is in that configuration. The watercraft may transition between the two configuration by selectively varying the displacement of the watercraft or by articulating of the aft extension.

28 Claims, 12 Drawing Sheets

(56) References Cited

U.S. PATENT DOCUMENTS

| | | | | |
|---|---|---|---|---|
| 8,096,252 | B2* | 1/2012 | Huang | B63H 5/125 |
| | | | | 114/77 R |
| 8,342,114 | B2* | 1/2013 | Goubault | B63B 1/08 |
| | | | | 114/56.1 |
| 8,434,420 | B2* | 5/2013 | Muller | B63B 27/143 |
| | | | | 114/259 |
| 8,459,198 | B2 | 6/2013 | Kilgore | |
| 8,943,993 | B2* | 2/2015 | Mueller | B63B 83/30 |
| | | | | 114/291 |
| 9,855,995 | B2* | 1/2018 | Fafard | B63B 1/32 |
| 10,926,838 | B2* | 2/2021 | Kalil | B63B 1/08 |
| 2011/0126751 | A1 | 6/2011 | Mueller | |
| 2020/0385089 | A1* | 12/2020 | Dougherty | B63B 3/48 |

* cited by examiner

MARINE VESSEL WITH AFT EXTENSION

CROSS REFERENCE TO RELATED APPLICATIONS

This application claims the benefit of priority pursuant to 35 U.S.C. § 119(e) of U.S. provisional patent application No. 62/992,822, filed 20 Mar. 2020, entitled "MARINE VESSEL WITH AFT EXTENSION," which is hereby incorporated by reference herein in its entirety.

TECHNICAL FIELD

The present disclosure generally relates to marine vessels or watercraft and more particularly to a watercraft having an extension aft of the transom that alters the wake of the vessel in at least one configuration of the vessel and optionally provides water access aft of the transom in a location that may be less visible to an observer.

BACKGROUND

Marine vessels and other watercraft may include openings for facilitating access to the water below the vessel. In existing marine vessels, such an opening, also referred to as a moon pool, is often formed near midships in a section of parallel mid body with primarily flat bottomed transverse sections, which may be below the waterline in normal operation of the vessel. In such instances, to access and use the moon pool, complex air and water pressure control systems may be necessary, which increases the weight of the vessel. In addition, while flat-bottom transverse sections with round bilges are practical for displacement hull forms (typical of large ships) they do not generally enable high-performance (e.g., high-speed, maneuverable, and dynamically stable) in a marine vessel. To achieve higher performance, generally a v-shaped hull design is used, which makes the integration of a moon pool difficult. In addition, variable displacement craft may be difficult to equip with a moon pool or similar opening due to the variability in the vertical location of the waterline. Therefore, designers and manufacturers of high-performance, variable displacement, or other watercraft continue to seek improvements thereto.

SUMMARY

A marine vessel (also referred to as a boat or watercraft) according to some embodiments of the present disclosure includes a hull that extends from the bow to the stern of the watercraft. The stern may be a transom stern and may thus include a transom. The watercraft may include an aft extension coupled to the hull to extend aft of the transom, wherein the aft extension has a bottom side offset vertically from the keel such that the bottom side is located above a waterline when the watercraft is in a first configuration and the aft extension is at or below the waterline when the watercraft is in a second configuration.

In some embodiments, the watercraft may be a variable displacement watercraft or vessel. In some such embodiments, reconfiguring the watercraft between the first and second configurations may involve actively, selectively changing the watercraft's displacement. To that end, the watercraft may include a ballast system, which includes at least one ballast tank within the hull cavity, the ballast system being configured to selectively vary the amount of ballast within the ballast tank in order to vary the displacement of the hull between a first (e.g., high) freeboard configuration, in which the hull displaces a first amount of water, and a second (e.g., low) freeboard configuration in which the hull displaces a second amount of water greater than the first amount of water. In some embodiments, the watercraft may include a weather deck that encloses at least a portion of the cavity defined by the hull, and a superstructure that extends above the weather deck. In so nae such embodiments, the aft extension may be an extension of the superstructure that extends aft of the transom and may thus be referred to as a transom extension. The aft extension may be coupled to the hull of the watercraft such that its lower or bottom side is vertically offset above the keel of the watercraft. The bottom side of the aft extension may be located above the waterline when the watercraft is in a high freeboard configuration and the bottom side is at or below the waterline when the watercraft is in a low freeboard configuration.

In some embodiments, the bottom side may be substantially flat. In some embodiments, the bottom side may be substantially at the same elevation as the stern end of the weather deck. In some embodiments, the aft extension is a substantially hollow enclosure that encloses a rear deck of the watercraft that extends beyond or aft the transom. The bottom side of the aft extension may define an opening to provide access into or out of the aft extension (e.g., into the interior of the hollow enclosure). The opening may be selectively sealable, e.g., by a crew member of the watercraft, for example when the watercraft will be operated in the low freeboard configuration. In some embodiments, the opening may be sealed by a hatch which is operatively associated with the opening. The hatch may be implemented using any suitable structure, such as a panel or plate of sufficient strength and rigidity to withstand the relevant loads (e.g., bending, shear, membrane, or other loads which may be applied to the hatch from the inside, for example by personnel or cargo resting on the hatch, from the outside, for example by the hydrostatic pressure, and/or loads transmitted through the structure). The hatch may be pivotally coupled to the surrounding structure. In some embodiments, the hatch may be differently coupled (e.g., slidably) such that the hatch opens and closes by moving in a direction substantially parallel to the bottom side of the aft extension. The latter may provide a more compact closure design and/or conserve more of the interior space of the aft extension for other use by the crew of the watercraft. The hatch may be configured to open from the interior of the aft extension, for example to gain access to the exterior of the Watercraft from inside the watercraft. The hatch may also be openable from the exterior such as to permit ingress into the watercraft through the aft extension. In some embodiments, the aft extension defines an interior void or passage that connects the interior of the aft extension to the interior of the watercraft (e.g., to the superstructure and/or any enclosed areas below deck), the passage being sufficiently large to accommodate a person there through. In some embodiments, the passage may be sufficiently large to enable a person to crawl through, kneel, or stand. In some embodiments, the upper or top side of the aft extension (e.g., a roof or ceiling panel of the hollow enclosure) may be positioned at the elevation of the nearest ceiling panel of the super structure.

In some embodiments, the outer surfaces of the aft extension may be coplanar with the adjacent surfaces of the superstructure. For example, the upper or top side of the aft extension (e.g., a roof or ceiling panel of the hollow enclosure) may be positioned at the elevation of the nearest ceiling panel of the super structure. One or both of the outboard (i.e. starboard and port) sides of the aft extension may be co-planar with the corresponding outboard side of the superstructure. As such, the aft extension may extend the superstructure aft of the transom a streamlined manner. The aft extension may be configured to alter the wake of the hull when the watercraft is in the second freeboard configuration. For example, in some embodiments, the width of the aft extension may decrease in the longitudinal direction away from the transom. In some embodiments, the outer (e.g., outboard and ceiling) surfaces of the aft extension ay be inclined or angled inboard such as to taper or narrow the width of the aft extension in multiple directions. In some embodiments, the aft extension may be tapered substantially to a point at the aft-most end of the extension. The length of the aft extension may be selected to ensure that the aft extension remains above water when the watercraft is in a high freeboard configuration (e.g., when planing) The bottom side of the aft extension may be vertically offset above the keel such that it is located at an elevation above the watercraft's propulsor(s) that may extend aft of the transom. The opening on the bottom side of the aft extension may be arranged longitudinally aft of the propulsor(s).

A variable displacement watercraft or vessel according to some embodiments includes a hull defining a hull cavity, the hull having a transom, a weather deck enclosing at least a portion of the hull cavity, a rear deck coupled to the hull and extending aft of the transom, an aft enclosure that substantially encloses the rear deck whereby a bottom surface of the aft enclosure encloses an underside of the rear deck, and a ballast system that selectively varies an amount of ballast within the hull cavity to vary the displacement of the hull between a first displacement configuration associated with a first waterline located below the bottom surface of the aft enclosure and a second displacement configuration associated with a second waterline located at or above the bottom surface of the aft enclosure. In some embodiments, the rear deck is at substantially the same elevation as a stern end of the weather deck. In some embodiments, an upper surface of the rear deck is coplanar with an upper surface of the stern end of the weather deck. In some embodiments, the watercraft includes one or more propulsory that have an external portion extending aft of the transom, and the rear deck extends aft of the external portion of the propulsor. In some embodiments, the aft enclosure includes an access hatch coupled to the rear deck to selectively open and close an opening through the underside of the rear deck. In some embodiments, at least a portion of the opening is located aft of the external portion of the propulsor. In some embodiments, the access hatch opens from inside the aft enclosure. In some embodiments, the aft enclosure is sized to accommodate a passage of a person or equipment therethrough. In some embodiments, the rear deck narrows in a direction aft of the transom.

The above summary is not intended to describe each embodiment or every implementation of the present disclosure.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
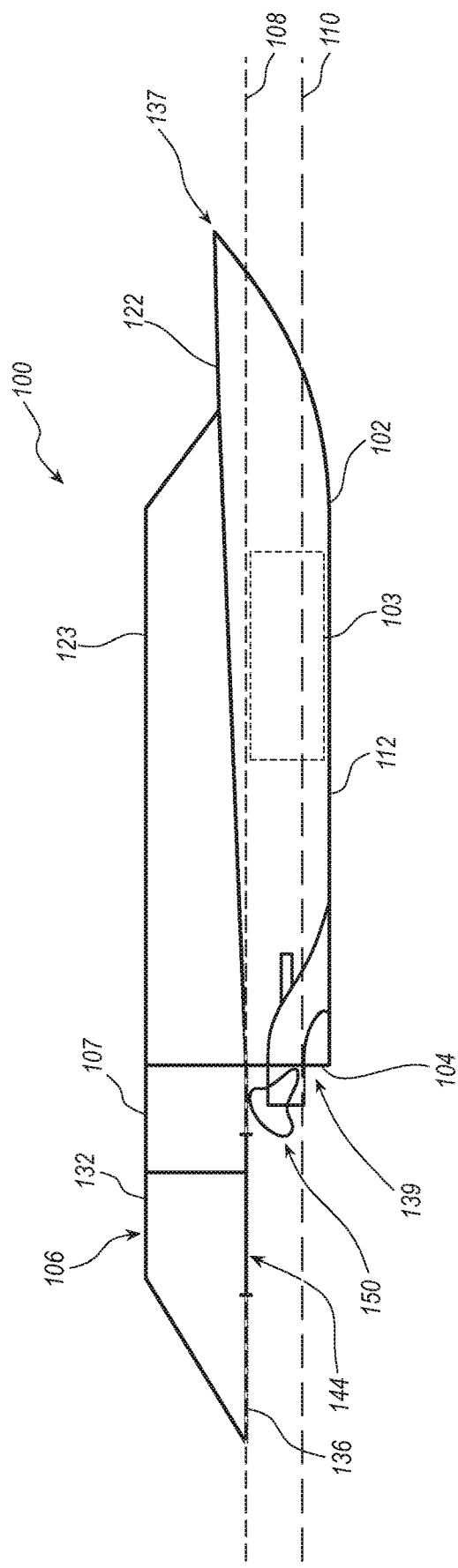
FIG. 1 is a simplified profile view of a watercraft having an aft extension according to the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION

The present disclosure generally relates to watercraft that are equipped with a structure that extends aft of the stern (e.g., transom stern) of the watercraft, referred to here as aft extension, and which is positioned vertically to be above the waterline of the watercraft in at least one configuration and to be at or slightly below the waterline in at least one other configuration. As such, the performance characteristics of the hull (e.g., the size of the wake produced by the hull) may be varied when a configuration of the watercraft changes. In some embodiments, this may be achieved by a variable displacement watercraft or vessel; which has an aft extension that is fixed to the aft end of the hull so as to extend aft of the transom of the watercraft. When the variable displacement watercraft is in a high freeboard configuration, the aft extension may be vertically above the waterline associated with a high freeboard configuration. When the watercraft is configured into a low freeboard configuration, such as by taking on additional ballast, the aft extension may be located at or slightly below the waterline. A variable displacement watercraft according to the present disclosure may be a high-performance watercraft capable of being supported by dynamic lift (e.g., planing) when travelling at high speeds (e.g., in excess of volume Froude number 2.8), while also being capable of operating in low freeboard mode with a larger portion of the hull, in some case most if not all of the hull, of the watercraft submerged in water. Such multi-mode operation of the marine watercraft may create challenges in designing a watercraft's hull that can adequately address the operational needs of the watercraft and some of which challenges are addressed by the examples of the present disclosure. For example, the speed of existing craft is typically limited by the height of the wake when in low freeboard mode. Current designs also limit crew members' ability to access the transom and/or egress out of or ingress into the watercraft while maintaining a desired observability characteristic of the watercraft. In those cases, a door or hatch may have to be opened at the rear of the watercraft in order for the crew to exit the watercraft, reach the transom, or exchange a payload at the stern. In other embodiments, the variability in the vertical position of the aft extension with respect to the watercraft's keel, and thus with respect to the watercraft's design waterline, may be achieved by an articulating aft extension, such as in the examples shown in FIGS. 11A-B and 12A-B. For example, the structure that defines the aft extension may be movably coupled to the stern end of the watercraft (e.g., aft of the transom) and may be movable vertically up and down to position the aft extension into and out of the water, reconfiguring the watercraft between a first configuration in which the bottom side of the aft extension is offset vertically from the keel such that it is located above the waterline, and a second configuration in which the bottom side of the aft extension is at or below the waterline without having to vary the displacement of the watercraft. An aft extension according to the present examples may thus be configured to be used with a variety of watercrafts which may be, but do not need to be, a variable displacement vessel.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, methods described may be performed in an order different from that described, and various steps may be added, omitted, or combined. Also, features described with respect to certain embodiments may be combined in other embodiments.

Figure 2:
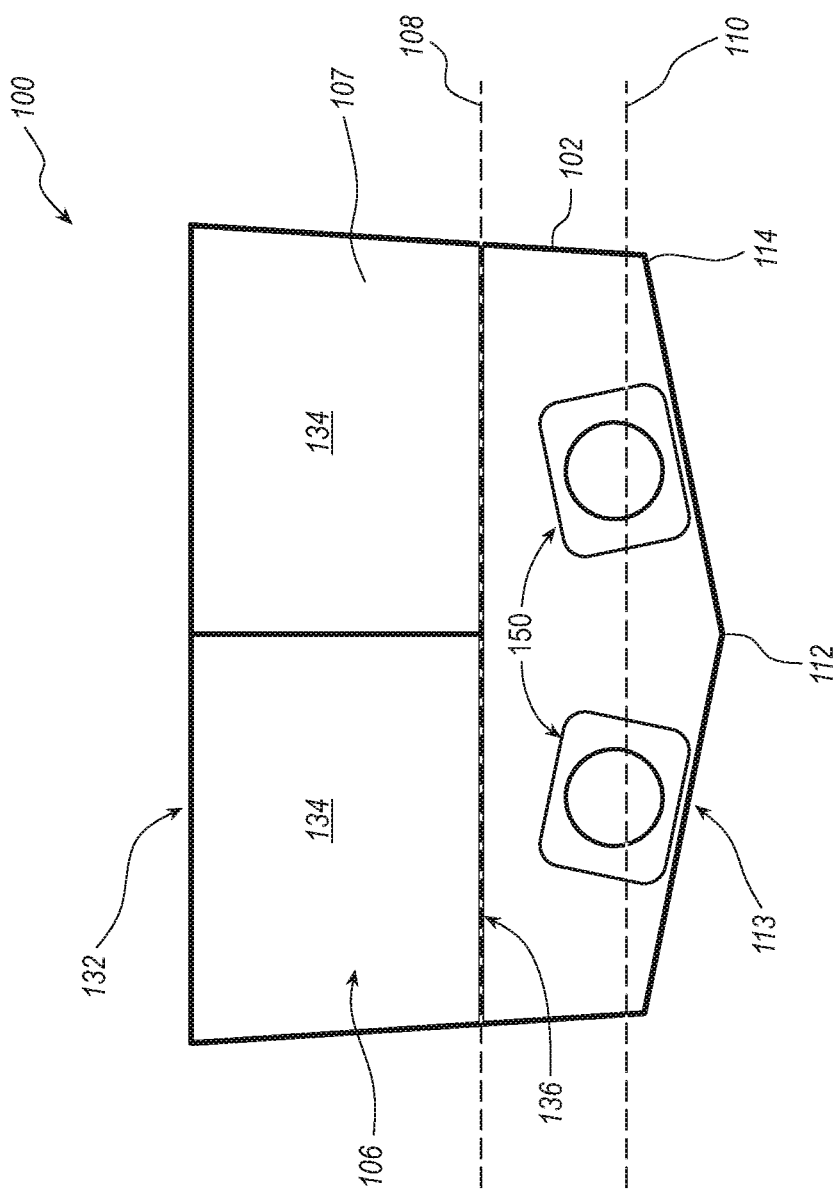
FIG. 2 is a simplified stern view of the watercraft of FIG. 1.
Figure 3:
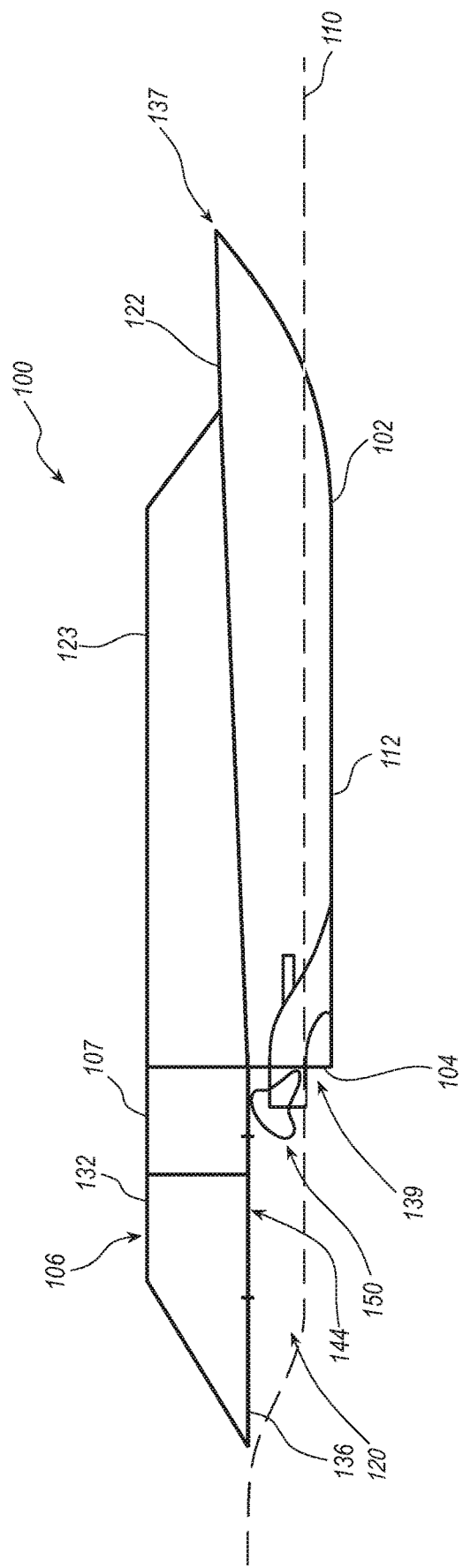
FIG. 3 is a simplified profile of the watercraft of FIG. 1 in a high freeboard configuration.

FIGS. 1-3 show simplified views of watercraft 100 (also interchangeably referred to as marine vessel or simply vessel) according to some examples of the present disclosure. The watercraft 100 has a hull 102 that extends from the bow 137 to the stern 139 of the watercraft 100. The stern 139 of watercraft 100 may be configured as a transom 104 stern, which implies that the stern may be provided by a generally transverse (e.g., substantially perpendicular to the longitudinal direction) structural member that extends substantially vertically from the keel 112 of the watercraft 100. One or more propulsors 150 including, but not limited to, one or more outboard motors, waterjets, stern drives, surface piercing drives, submerged fixed pitch propellers on inclined shafts, and/or pod drives, may extend from or be located in the vicinity of the transom 104. In some embodiments, the transom 104 may be the structural member that supports the external portion of the propulsor(s) 150. The transom 104 may be generally flat and vertically oriented. A boat configured for high-speed, powered operation may have a transom 104 stern as in the example of watercraft 100 in FIG. 1, which in combination with other aspects of the hull (e.g., optionally, a V-shaped bottom) may facilitate the boat's ability to maintain planing speeds and maneuverability in a seaway. While referring in specific examples herein to operating in planing mode or at planing speed or describing the watercraft as having a planing hull, the examples herein can be applied to virtually any watercraft that can be selectively operated in a condition in which the watercraft is supported by dynamic lift (also referred to as dynamically supported craft), planing being a sub-category thereof. Dynamically supported watercraft which may include an aft extension according to the present disclosure may include, but are not limited to, hydrofoils, surface effect ships (SFS), and any mono-hull or multi-hull configurations thereof.

A weather deck 122 may enclose at least a portion of the cavity defined by the hull 102. In some embodiments, the watercraft 100 may include a superstructure 123 that extends above the weather deck 122. In some embodiments, the hull cavity defined by the hull 102 may be substantially fully enclosed, in some cases in a watertight manner, by the weather deck 122 and/or the superstructure 123. In some embodiments, the superstructure 123 may extend longitudinally up to the stern 139 of the watercraft 100. The superstructure 123 may have outboard walls that extend and meet the outboard sides of the hull 102, or the outboard walls may be offset, at least along a portion of the superstructure, inboard from the outboard hull surfaces such that there is a walking path (e.g., side deck portions) defined between the superstructure 123 and the outboard sides of the hull 102, which may in some embodiments be continuous with a fore deck and/or and aft deck of the watercraft 100.

The watercraft 100 may be a variable displacement watercraft, which means that it is configured to actively (selectively) vary its displacement. The watercraft 100 may include a ballast system 103 that includes one or more ballast tanks for selectively varying the weight and thus the displacement of the watercraft. The ballast system may be operable to selectively vary the amount of ballast within the ballast tank(s) in order to vary the displacement of the hull 102, for example between a first freeboard or displacement configuration (e.g., high freeboard configuration), in which the hull displaces a first amount of water, and a second freeboard or displacement configuration (e.g., a low freeboard configuration), in which the hull displaces a second greater amount of water. In the high freeboard configuration, the hull may displace a smaller volume of water and the associated waterline 110 may be referred to as a low waterline 110 as compared to the low freeboard configuration in which the hull displace a greater volume of water and thus the associated waterline 108 may be referred to as a high waterline 108. In other embodiments, aspects of the present disclosure such as the aft extension for selectively altering the wake of a watercraft in at least one configuration of the watercraft, may apply to watercraft that are not designed for intentionally varying the hull's displacement. In such embodiments, as described further below, the selectively altering the wake may be achieved by an articulating aft extension which is movably coupled at the stern end of the watercraft to vary the vertical offset of the aft extension from the keel of the watercraft.

The marine vessel or watercraft 100 may be a high-performance (e.g., a high-speed) watercraft, for example capable of travelling in excess of volume Froude number 2.8, with agile maneuverability, dynamically stable. As shown in FIG. 2, which shows a stern view of the watercraft 100, the hull 102 may have a generally V-shaped bottom 113 profile, referred to as a V-shaped (or vee-shaped) hull. The hull 102 may have generally straight or cambered sections from the keel line 112 to the chine 114, which may allow the watercraft 100 to be fast and maneuverable on the water, particularly while planing (e.g., in a high freeboard configuration). In some embodiments, the bottom (e.g., V-portion) of the hull 102 may be equipped with strakes or other suitable features (e.g., for enhancing lift and/or reducing drag). While the hullform is shown illustratively as a single-chine hull, it will be understood that the hull 102 may be a multi-chine hull. Furthermore, the hull 102 can comprise multiple hulls, such as a set of pontoons or demihulls used in catamarans or trimarans.

As described herein, the watercraft 100 may be a variable displacement watercraft equipped with a ballast system that enables the vessel 100 to selectively vary (e.g., by taking on or expelling) ballast (e.g., a ballast fluid) to vary the freeboard of the watercraft 100 such as between a high freeboard, in which a relatively smaller portion of the hull is submerged in the surrounding water as indicated by an exemplary low (e.g., a minimum) waterline 110, and a low freeboard in which a relatively larger portion of the hull is submerged in the surrounding water as indicated by an exemplary high (e.g., a maximum) waterline 108. In an example high freeboard mode, the marine watercraft 100 may be configured to sit relatively high above the water, e.g., as shown by the low waterline 110, in which mode the waterline 108 may be substantially at or slightly above the chine 114. In an example low freeboard mode, the watercraft 100 may be configured to sit lower in the water, e.g., as shown by the waterline 108, in which mode the watercraft 100 may operate as a displacement watercraft or a semisubmersible watercraft. The marine vessel or watercraft 100 may include a ballast system (e.g., ballast tank(s) and pumps, not shown) for selectively varying the displacement and/or center of gravity of the craft (i.e., irrespective of the cargo onboard the vessel) and thus for adjusting the freeboard of the hull 102 while the watercraft 100 is operated on the water. For example, the ballast tank(s) can be filled with a first amount of ballast fluid (i.e. the fluid being used for ballast can include but is not limited to freshwater, seawater, mud, or fuel) to provide a low freeboard configuration of the watercraft 100 (e.g., associated with high waterline 108) and can be at least partially emptied to contain a second amount of water or substantially no water to provide a high freeboard configuration of the watercraft 100 (e.g., associated with the low waterline 110). The ballast system and/or its operation for controlling the displacement of the watercraft 100 and/or the location of the center of gravity of the watercraft may be implemented in accordance with any of the examples in patent application U.S. Ser. No. 16/826,044, which is incorporated herein in its entirety. While in FIG. 1 two waterlines are shown for illustrative purposes only, it will be understood that the watercraft 100 may be operated at any displacement supported by the ballast control system (e.g., ballasts such as anywhere between the exemplary high and low freeboard modes shown in FIG. 1, e.g., by taking or expelling sufficient amount of water into or from the ballast system to locate the waterline at any desired location between the exemplary waterlines 108 and 110 shown in FIG. 1. In some embodiments, the low freeboard mode(s) of the watercraft 100 may include a semi-submersed mode, in which a substantial portion of the hull, e.g., up to 90% or more, may be submerged in the surrounding water. In some embodiments, when operating in low freeboard mode, a significant portion of the hull 102 of the watercraft 100 (e.g., vertically up to or slightly above the location of the weather deck 122) may be submerged in the surrounding water. In some embodiments, substantially the full hull 102 may be submerged with only the superstructure 123 being above the w e line 108.

In accordance with the present disclosure, the watercraft 100 may include a structure extending longitudinally aft of the transom 104 of the watercraft 100, which is referred to herein as aft extension 106, or interchangeably a transom extension 106. In some embodiments, in which the superstructure 123 extends to the stern 139 of the watercraft 100, the aft extension 106 may be connected to the superstructure 123 and may thus function as an aft extension of the superstructure, extending the superstructure aft of the transom 104. The aft extension 106 may be coupled to the hull 102 of the watercraft 100 such that its lower or bottom side 136 is vertically offset above the keel 112 of the watercraft 100. The bottom or underside 136 of the aft extension 106 may be located above the waterline when the watercraft is in a high freeboard configuration. In other words, the bottom or underside 136 of the aft extension 106 may be located vertically above the low waterline 110 as shown in FIG. 1. The bottom or underside 136 of the aft extension 106 is at or below the waterline when the watercraft is in a low freeboard configuration. That is, when the ballast system is in a loading state in which a larger amount of water is displaced and the waterline of the watercraft is a high waterline 108, the bottom or underside 136 of the aft extension 106 is at or below the waterline 108, as shown in FIG. 1. In such a configuration or state, the underside 136 (e.g., the bottom surface) of the extension 106 is in contact with and/or submerged in ater. As described in further detail below with respect to FIGS. 11A-B and 12 A-B, in other embodiments, the structure that defines the aft extension 106 may not be fixed to the hull whereby the watercraft 100 need not be a variable displacement watercraft. The aft extension 106 may be movably coupled to the hull 102 such that it can be positionable with its bottom side located at two different vertical positions with respect to the hull. For example, the aft extension 106 may be movable from the position shown in FIG. 1, while remaining operatively attached to the hull 102, to a vertical position in which at least a portion of the bottom side of the aft extension 106 is at or below waterline 110. In embodiments herein, the aft extension 106 may be articulated in any suitable manner, such as by pivoting and/or translating the aft extension 106 vertically and/or longitudinally to position the underside or bottom side of the aft extension 106 out of contact with (e.g., above) the water. In such embodiments, placing the bottom side at or below the waterline may be achieved without varying the displacement of the watercraft and may achieve the advantages described herein in a watercraft that may not be a variable displacement watercraft. In some embodiments, a variable displacement watercraft may be equipped with a moveable, rather than fixed, aft extension.

The aft extension 106 may be implemented as a structure, in some embodiments a substantially hollow structure or enclosure 107, that extends aft of the stern 139 (e.g., aft of the transom 104) of the watercraft. The aft extension 106 may be coupled to the hull, e.g., as a permanent fixture or removably, at a location that is vertically offset from the keel 112. In some embodiments, the aft extension 106 may be coupled to the hull 102 such that most of the structure 107, in some cases substantially all of the structure 107, is located at and vertically above the elevation of the weather deck 122 of the watercraft 100. The aft extension 106 may have enclosing or outer surfaces (e.g., side outer surfaces 134 and an overhead outer surface 132) that substantially fully enclose a rear platform or deck 140 of the watercraft 100. The rear deck 140 may extend aft of the transom 104, and in some cases aft of the external portion(s) of the propulsor(s) 150. In some embodiments, the rear deck 140 may be an extension of (e.g., coplanar with) the weather deck 122 that spans and/or encloses at least a portion of the hull 102. Vertically (or elevationally) the aft extension 106 may be arranged such that the aft extension 106 is above the waterline 110, and is thus out of contact with the surrounding water, when the watercraft 100 is operating in a high freeboard mode. The aft extension 106 may provide a fully enclosed rear compartment located aft of the transom 104 of the watercraft 100 and located, at least in one operational mode of the watercraft 100, above the rater. In some embodiments, the aft extension 106 is coupled to the hull 102 such that its deck 140 bottom or under side 136 is above the external portions of the one or more propulsors 150, as can be seen in FIGS. 1-3.

The hull 102 of the watercraft 100 may be configured as a planing hull, such as to enable the watercraft 100 to plane at sufficiently high speed. As will be understood, the term "planing" is used to describe a condition in which a watercraft develops a net positive pressure hydrodynamic lift) in reaction to watercraft trim and the velocity of water over the wetted hull surface, to support the majority of the watercraft's weight. A V-shaped hullform (i.e., a hull with a V-shaped bottom profile) may improve seakeeping, speed in a seaway, and maneuverability, which may be advantageous for a high-performance operations (e.g., when planing) but may introduce challenges for other operational criteria. When planing, the speed and the trim of the watercraft 100 may cause a wake pattern behind the transom 104, with a characterizing depression or void 120 immediately behind the transom 104, the length of which may be used to size the aft extension 106. The length of the aft extension 106 may be selected to minimize or eliminate penetration of the aft extension 106 into the water while the watercraft 100 is planing and during the transition from displacement mode to planing. In some embodiments, the length of the aft extension 106 may be about 3% to about 9% of the watercraft's overall length (from the bow to the transom). The length of the rear extension 106 may vary in other embodiments depending on the overall length of the watercraft 100, the speed, trim profiles, displacement, desired size of the depression 120 of the wake pattern, and other relevant parameters affecting the transition to planing mode and the boat's operation in planing mode. In some embodiments, the aft extension 106 may have a length selected to avoid the aft extension 106 becoming submerged and/or dragging in the water during the transition to, or upon reaching, planing mode, during which the watercraft 100 may have a greater positive trim than illustrated in FIG. 3. In this manner, the aft extension 106 may be configured to eliminate or reduce any adverse impact on the overall drag of the watercraft in high freeboard mode.

Figure 4:
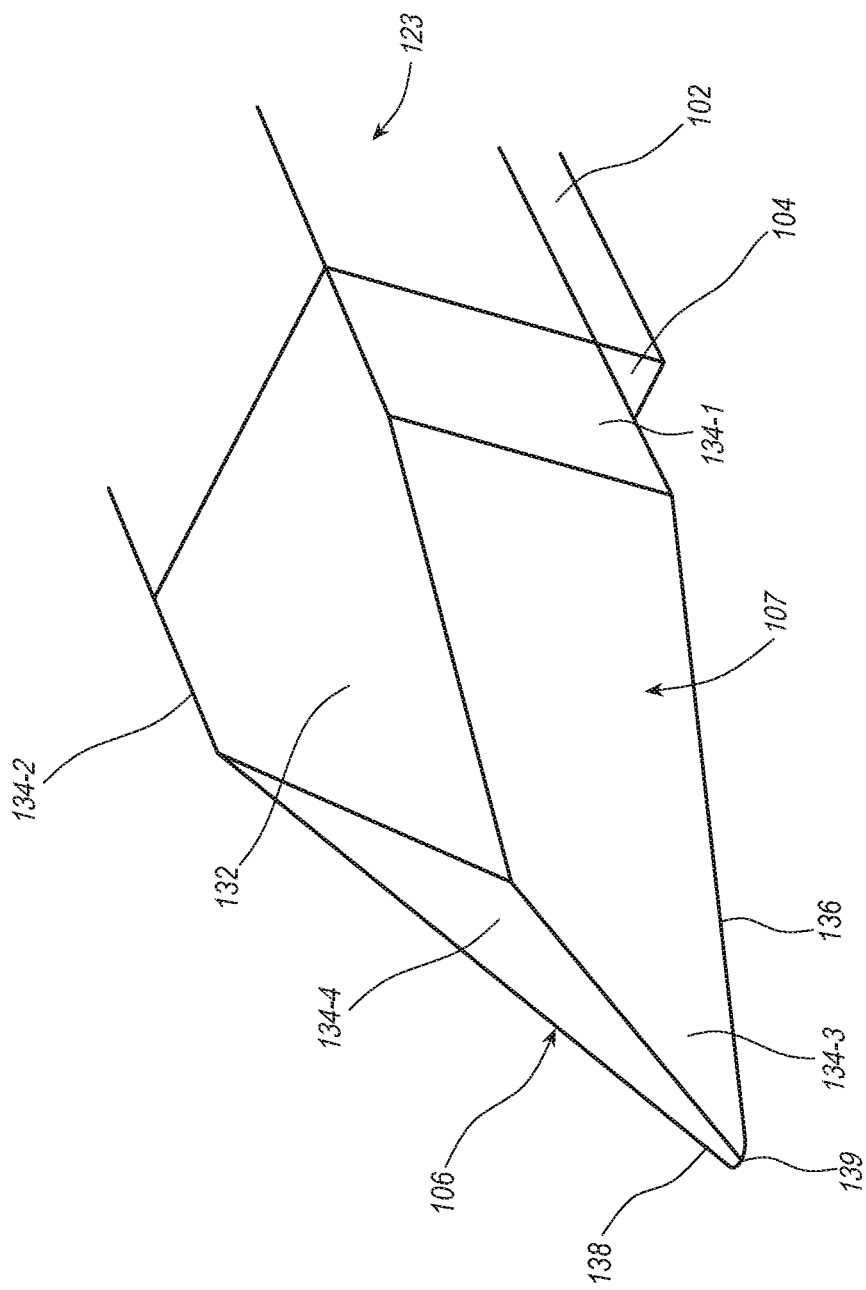
FIG. 4 is a simplified perspective view of an aft extension for a watercraft such as the watercraft of FIG. 1.

Referring now also to FIG. 4, the enclosing surfaces (e.g., side and overhead surfaces 134 and 132, respectively) of the aft extension 106 may be configured to be coplanar with the adjacent surfaces of the hull and/or superstructure 123. As such, the surfaces of the aft extension may follow the contour of the adjacent surfaces of the hull and/or superstructure 123 of the watercraft 100 across the interface therebetween. For example, the upper (or overhead) surface 132 may be coplanar so as to continue the contour of the upper or overhead surface of the superstructure 123 or weather deck 122 adjacent to the aft extension 106. The side surfaces (e.g., 134-1 and 134-2) may similarly be coplanar so as to continue the contour of the side or outboard surfaces of the superstructure 123 adjacent to the aft extension 106. As such, the structure 107 may act as an extension of the superstructure 123 aft of the transom 104. The structure 107 may taper or narrow towards the aft end 139 of the aft extension 106. For example, the structure 107 may narrow in width towards the aft end 139, thereby reducing the beam (i.e., width) of the stern of the watercraft when the aft extension 106 is in contact with the water. In some embodiments, the structure 107 may taper or narrow in other dimensions, e.g., reducing in height towards the aft end 139, as shown for example in FIGS. 1, 3, 4, 7 and 9. The forward end of the aft extension 106 that mates with the stern end of the superstructure 123 may have a complementary shape to that of the super structure, so as to extend the superstructure aft, beyond the transom 104. While shown here as spanning along a large portion of the deck, the superstructure 123 may span a different smaller portion in other examples, such as extending only along a stern portion of the watercraft 100. In yet other examples, the watercraft 100 may have multiple distinct superstructures at different longitudinal locations of the watercraft 100.

In some embodiments, the aft extension 106 may be fixed to the hull in that it is coupled to the hull in a manner not intended for articulating or moving the aft extension 106 during normal use of the watercraft 100, such as when operating the watercraft on the water). In some embodiments, the aft extension 106 may be movably attached, e.g., as described with reference to FIGS. 11A and B, and 12A and B. Optionally, whether movably coupled or fixed, the aft extension 106 may be configured as a modular component and coupled to the watercraft such that it may be removable and/or replaceable, for example for repairs and/or so that it may be interchanged with a different modular component that may provide a different internal or external contour. In yet other examples, the aft extension 106 may be configured as a permanent fixture and thus generally designed and coupled to the hull so as not to be removed therefrom during the useful life of the watercraft 100. In some examples, the aft extension 106 may not be connected and/or provide access into and out of the watercraft 100. The structure 107 may be implemented using any suitable combination of outer surfaces (e.g., generally flat surfaces that may meet at sharp angles and/or curved/domed surfaces) that enclose the rear deck 140. The aft extension 106 may be formed of the same or similar rigid materials as used for the hull and/or upper deck enclosure, such as any suitable metal or composite (e.g., a fiber-reinforced composite c-glass, carbon, kevlar etc.). In some embodiments, the aft extension 106 may be rigidly attached (e.g., bolted, welded, riveted, or otherwise affixed) to the watercraft 100, such as to the hull 102, the main deck and/or the superstructure 123, so as to be substantially unmovable during normal use of the watercraft 100 (e.g., when the watercraft 100 is operated in a waterway). In some embodiments, the lateral side surfaces 134-1 and 134-2 may extend from and be coplanar with the outboard surfaces of the superstructure 123 near the attachment interface, and may taper (e.g., via angled surface 134-3 and 134-4) to substantially a point at the aft end 139. In other embodiments, the lateral side surfaces 134-1 and 134-2 may extend from and be coplanar with the outboard sides of the superstructure and then be contoured to taper or narrow the beam of the watercraft at the aft end 139. In some embodiments, one or more surface of the aft extension 106 may be integrally formed with a surface of the superstructure 123. In other embodiments, the aft extension 106 may be a movable structure that can be lowered toward the water, in at least one configuration such as when operating at lower speeds and which may be raised above the waterline in at least one other configuration such as when operating the watercraft as a dynamically supported watercraft (e.g., when planing).

In some embodiments, the bottom or underside 136 of the aft extension may be substantially flat (e.g., having a bottom surface 138 that is substantially planar). An opening 144 may be provided through the underside of the aft extension (e.g., through the bottom side 136 of the structure 107). The opening 144 may provide access into or out of the aft extension 106 (e.g., into or out of the interior of the hollow enclosure 107), and the opening 144 may thus be referred to as an access opening. The opening 144 may be selectively sealable, such as by a door or hatch 146 which may be operable by crew member. C of the watercraft 100 (see FIG. 7), to provide a water-tight seal such as to prevent the egress of water onto the watercraft 100 when the watercraft 100 is operated in the low freeboard configuration in which the underside of the aft extension 106 is in contact with or submerged under water.

Figure 5:
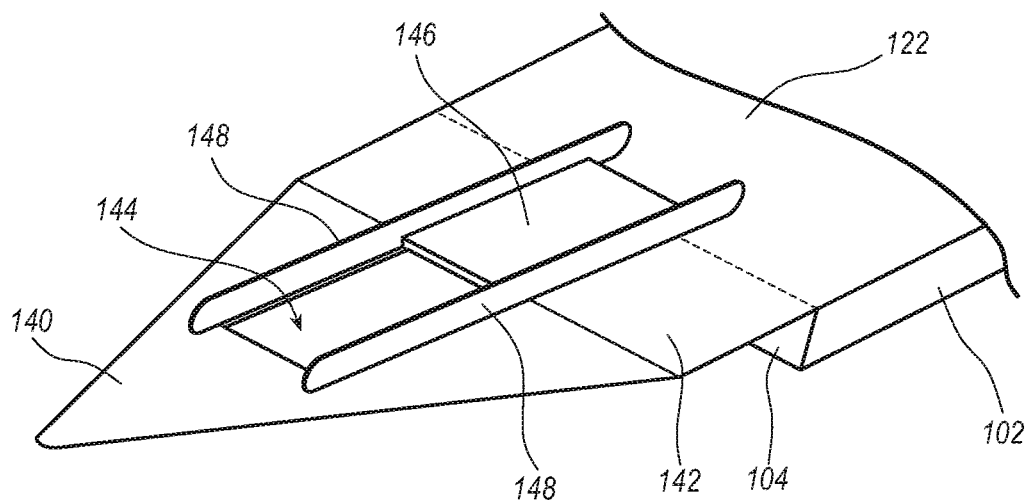
FIG. 5 is a simplified breakaway view showing the rear deck of the watercraft of FIG. 1.

FIG. 5 is a partial view illustrating the extended deck surface provided by an aft extension 106 according to the present disclosure. In some embodiments, the rear deck 140 may be at substantially the same elevation as the main deck (e.g., enclosed portion of the weather deck 122), and particularly any stern portion thereof, whereby the aft extension 106 may enlarge the available enclosed deck surface on the watercraft for personnel operating or onboard the watercraft 100. In some embodiments, the rear deck 140 may be generally coplanar with and continuous with any adjacent deck surfaces that are part of the main deck. In other examples, the rear deck may be stepped up or down from the main deck at the stern. In any case, the exterior surfaces of the enclosure 107 may be at an elevation that is vertically above the keel to position the bottom surface of the enclosure 107 above the water when the watercraft is in a displacement configuration other than a high (e.g., low freeboard) displacement configuration.

Figure 6:
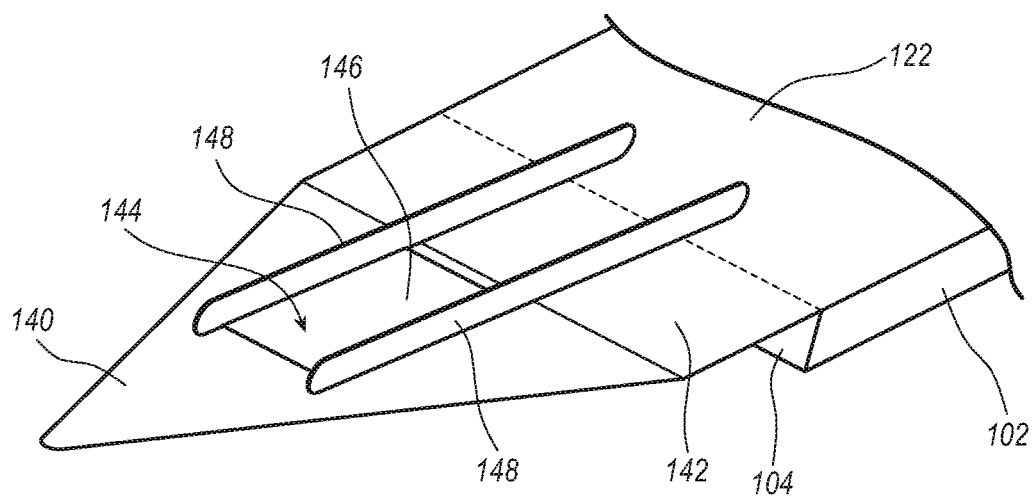
FIG. 6 is a simplified breakaway view of the rear deck of the watercraft of FIG. 1 showing the hatch of the access opening in a different position than in FIG. 5.

Referring now also to FIG. 6, the hatch 146 may be operatively associated with the opening 144 to seal the opening 144 as may be desired by the crew of the watercraft 100 (e.g., when the watercraft is to be provided in a high displacement configuration in which the underside 136 of the aft extension 106 is in contact with the water. The opening 144 may be provided on the underside 136 of the structure 107 and may face downward, whereby the opening 144 and/or use of the opening 144 (e.g., for ingress into or egress out of the watercraft) may be less visible to an observer, or substantially unobservable, in normal operating conditions. The hatch 146 may be implemented using any suitable structure, such as a panel or plate of sufficient strength and rigidity to withstand the relevant loads (e.g., bending, shear, membrane, or other loads which may be applied to the hatch from the inside, for example by personnel or cargo resting on the hatch, from the outside, for example by the hydrostatic pressure, and/or loads transmitted through the structure). In some embodiments, the hatch 146 may include or be made of a transparent material (e.g., glass, or a polymer or composite of sufficient strength and translucency to provide visibility through the hatch 146 when closed). The hatch 146 may be operatively coupled to the structure 107 and/or structure of the watercraft 100 (e.g., to the deck 122 and/or the superstructure 123) using any suitable mechanism, for example a hinge, a sliding joint such as a set of tracks. In some embodiments, the hatch 146 may be pivotally coupled to the surrounding structure, such as via one or more hinges. In some embodiments, the hatch may be differently coupled (e.g., slidably) such that the hatch 146 opens and closes by moving in a direction substantially parallel to the deck 140 surface. Such an arrangement may provide a more compact closure design and/or conserve more of the interior space of the aft extension 106 for other use by the crew of the watercraft 100. For example, as shown in FIGS. 5 and 6, the hatch 146 may be configured to slide along rails 148 which may extend along lateral sides of the opening 144. In some embodiments, the rails 148 may be substantially fully contained within the aft extension 106, for example in the case of a removable extension. In some embodiments, the rails 148 or other actuation mechanism, may be coupled to and extend into the watercraft 100 (e.g., along a portion of the main deck of the watercraft, or elsewhere in the superstructure 123).

The hatch 146 may be movable (e.g., slidable as in FIGS. 5 and 6) between a first or open position as shown in FIG. 5 and a second or closed position as shown in FIG. 6. In the open position, the opening 144 may be substantially unobstructed by the hatch 146 e.g., to provide access through the opening 144 to and from the exterior of the watercraft 100. In the second position, the hatch 146 seals the opening 144, e.g., in a watertight manner. A gasket or other sealing member may be provided on (e.g., along the perimeter of) the opening 144 and/or hatch 146 to seal the opening 144 and prevent ingress of water when the watercraft is in a displacement configuration in which the underside 136 and thus the opening 144 is submerged. The access opening 144 may function as a moon pool, avoiding certain disadvantages of existing moon pools which are typically integrated into the hull at a location that subjects the moon pool to significant loads thereby necessitating a more complex and heavier closure mechanism. In embodiments herein, the access opening 144 may only be submerged when the watercraft is in a low freeboard mode and may experience lesser loading, which may enable reducing the required force associated with sealing the access opening 144. In some embodiments, the hatch 146 may open from the interior of the aft extension 106, for example to gain access to the exterior of the watercraft from inside the watercraft. The hatch 146 may additionally or alternatively be openable from the exterior such as to permit ingress into the aft extension 106 and/or the watercraft 100 through the opening 144.

Figure 7:
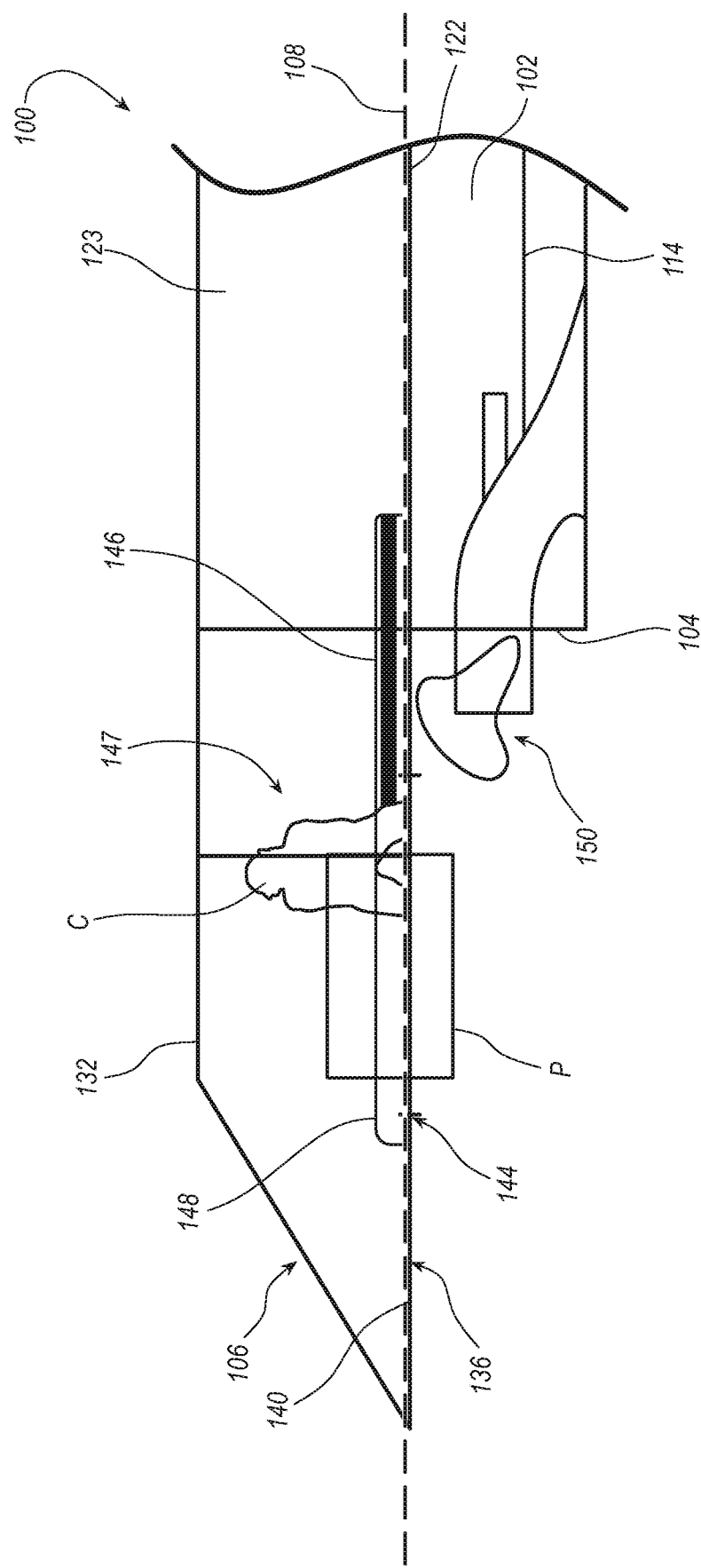
FIG. 7 is a simplified profile view of the aft portion of the watercraft of FIG. 1.

Referring now also to FIG. 7, the aft extension 106 may define an interior cavity 147 or passage that accommodates a person therein. The interior cavity 147 may be sized differently in different embodiments. In some embodiments, the interior cavity 147 may provide sufficient space to allow a person to crawl through, crouch, sit or kneel. In other embodiments, the interior cavity 147 may be sufficiently large (e.g., have a height) accommodating a person in a standing position. The cavity 147 and opening 144 may be sized to accommodate the passage of various sizes of payload P and/or the passage of crewmember C therethrough. In some embodiments, the cavity 147 may connect the interior of the aft extension 106 to the interior of the watercraft (e.g., to the superstructure 123 and/or any enclosed areas below deck 122). Being configured for variable displacement, the watercraft may be provided with a ballast system loading or configuration in Which the hull 102 displaces a sufficient amount of water to place the waterline below the underside 136 of the aft extension 106 at any desired vertical distance therefrom (e.g., immediately or slightly below the underside 136) to allow for the loading and/or unloading of personnel (e.g., a crew member(s) C) and payload(s) P with minimal impact on the visibility of any activity at the rear access opening. In some embodiments, the aft extension 106 may extend aft of the external portion of the propulsors 150, in some cases a sufficient distance aft of the transom to provide the access opening 144 at a location aft of the external portion of the propulsor 150 (e.g., as can be seen in FIG. 7). The opening 144 and correspondingly the hatch 146 may have any suitable size and/or shape including but not limited to rectangular, square, round, or elliptical shape. In an example embodiment, the internal cavity 147 and the opening 144 may be sized large enough to permit transfer of personnel or cargo up to about 5 feet long, about 4 feet wide, and about 4 feet tall. In an example embodiment, the extension 106 may have a height of up to about 4.5 feet and a length of up to about 12 feet. The configuration of the aft extension, including the internal cavity 147 and/or the size of the opening 144 can be selected based on the size of the rear deck 140, the outer profile of the superstructure at the stern of the watercraft, and/or the types of payloads or crew members anticipated to occupy or be transported with the watercraft 100. As such the specific examples provided herein are not limiting but are merely illustrative of one exemplary configuration of an aft extension according to the present disclosure.

Figure 8:
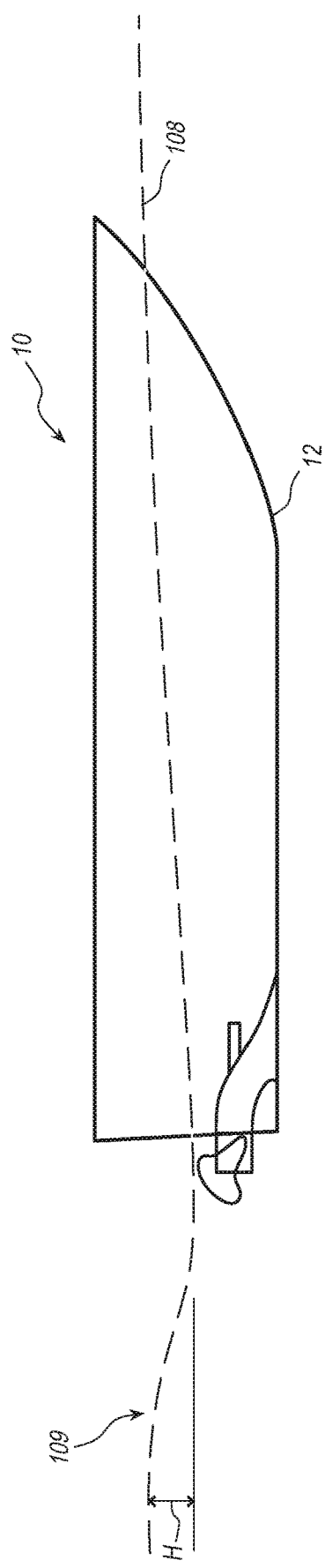
FIG. 8 is a simplified profile view illustrating the wake of a watercraft without an aft extension.
Figure 9:
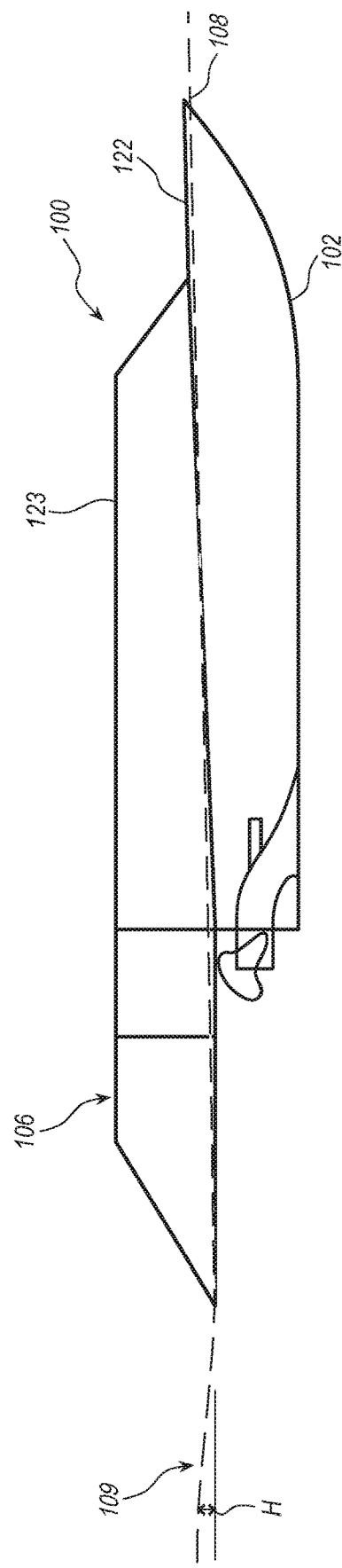
FIG. 9 is a simplified profile view illustrating an altered wake of a watercraft having an aft extension, such as the watercraft of FIG. 1.
Figure 10:
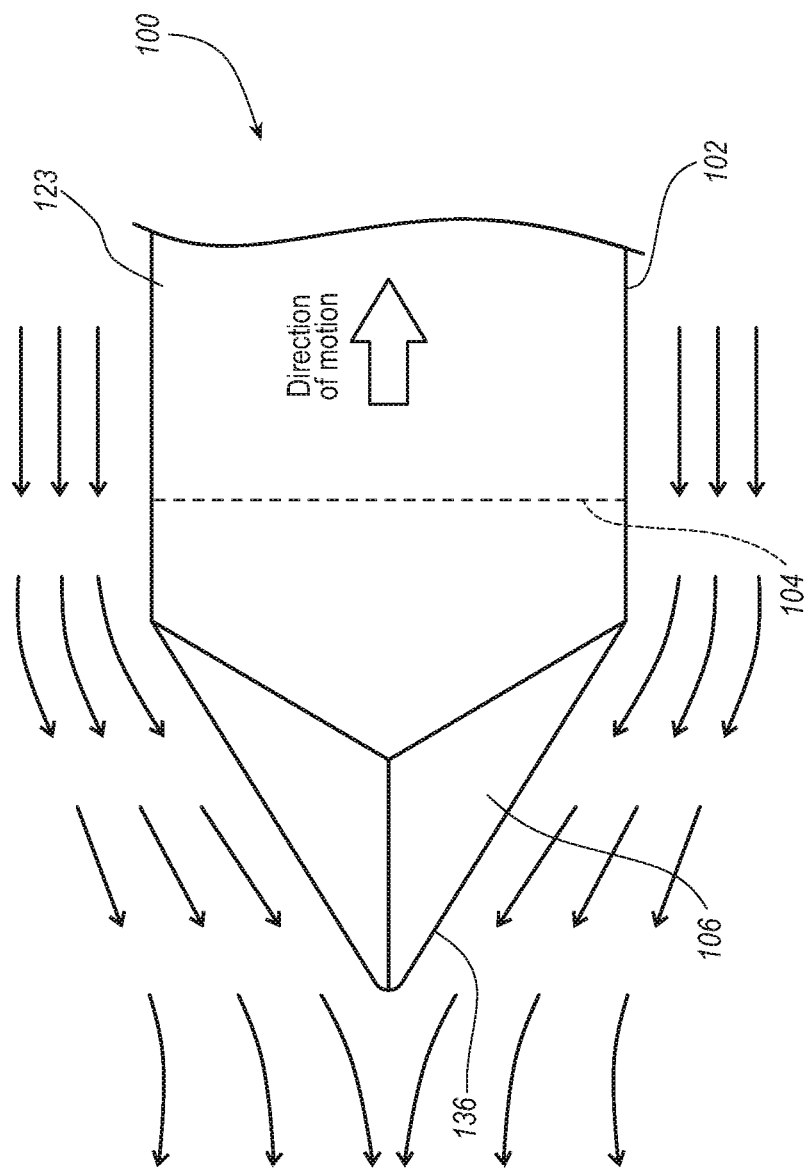
FIG. 10 is a simplified partial top view of the watercraft of FIG. 1 illustrating an impact of the aft extension to the wake behind the watercraft.

The aft extension 106 may be configured to alter the wake produced by the watercraft 100 in at least one displacement configuration (e.g., a low freeboard mode in which the underside 136 of the extension is in contact with the water). In some such embodiments, the width of the aft extension 106 may decrease in the longitudinal direction away from the transom, thereby reducing the beam at the aft end of the watercraft when the aft extension 106 is in the water (e.g., in the low freeboard mode). FIGS. 8-10 illustrate the impact of the aft extension in accordance with the principles herein on the wake of the watercraft. FIG. 8 shows a watercraft 10 with a transom stern and no aft extension. The hull 12 of the watercraft 10 in FIG. 8 displaces a given amount of water and the watercraft 10 generates a wake 109 behind the watercraft 10 at pre-planing speeds. FIG. 9 shows a watercraft 100 that also has a transom stern but has an aft extension 106 in accordance with the principles of the present disclosure. In a configuration in which the hull 102 of the watercraft 100 displaces substantially the same amount of water as the watercraft 10 in FIG. 8, the watercraft 100 may generate wake 109 which is smaller (e.g., with a reduced height H as shown in FIG. 9, and/or reduced width due to wrapping of the water flow around the tapered extension 106, as illustrated in FIG. 10) than the wake of the watercraft 10, at least in part due to the presence of an aft extension 106 which in this configuration contacts the water (e.g., has a bottom side or surface that is located at or below the waterline 108). The configuration shown in FIG. 10 of the watercraft 100 may be achieved by varying the displacement of the watercraft 100 to submerge a sufficient portion of the hull into the water to lower the aft extension 106 into contact with the water, or it may be achieved by articulating the aft extension 106 into a position in which it contacts the water, whether or not the displacement of the watercraft 100 is varied. As shown in FIG. 8, the wider beam (i.e. width) of a flat or transom stern of the watercraft 10 may result in a wake, which may be wider, taller, and/or more turbulent than the wake of a watercraft 100 that has a narrower beam at the stern by virtue of the tapered aft extension 106. The narrower beam provided by a tapered aft extension may alter (e.g., reduce the width, height and/or turbulence of) the wake of the otherwise flat or transom stern. With a flat transom, as shown in FIG. 8, the surrounding water is likely to expand laterally outward from the transom, and thus the width of the hull 12 at the transom, which is typically the same or substantially the same as the width over a large portion (length) of the watercraft 10, may define the minimum width of the wake, from whereon the wake further widens as the water waves propagate downstream of the boat. The taper of the aft extension 106 in FIG. 9 may facilitate a narrowing and/or height reduction of the wake such as by providing a contact or guide surface to allow the water to wrap around the stern of the watercraft. A tapered aft extension 106 provides a narrower beam at the stern of the watercraft 100 thereby reducing the width and/or height of the wake produced by the watercraft 100.

In some embodiments, the aft extension may be provided by a generally hollow enclosure that is configured as an extension of the superstructure 123. In some such embodiments, the aft extension may provide an enclosed passage that is sized to accommodate a person therethrough and that connects the interior of the superstructure 123 and/or hull cavity of the watercraft 100 to the interior of the generally hollow enclosure of the aft extension 106. In some embodiments, the aft extension 106 is positioned at substantially the same elevation as the weather deck 122, or at least the stern portion of the weather deck 122. In some embodiments, the aft extension may enclose a rear deck that extends aft of the transom and the deck surfaces of the rear deck and at least the stern portion of the weather deck may be substantially co-planar. As further illustrated in FIG. 10 which shows the stern end of the watercraft 100, the aft extension 106 may be tapered in some embodiments. For example, the aft extension 106 may taper inboard or narrow in the aft direction, in some cases tapering substantially to a point at the aft-most end of the aft extension 106. The tapering or narrowing may be in one dimension, for example, by narrowing the width of the extension from the wider beam (i.e. width) at the transom to a narrower beam at the aft-most end of the aft extension, in some cases, up to substantially a pointed end. The length of the extension 106 and its shape (e.g., whether it tapers generally to a point or to some smaller width than that of the transom 104) may be selected to achieve a desired amount of wake reduction (which may correlate to an increased extension length and/or a narrower transom beam) while reducing the risk or amount of contact of the rear-most end of the extension 106 in the water when the boat 100 transitions to planing, which as described, involves a temporary increase in positive trim as the boat comes to plane. In some embodiments, the aft extension 106 may taper or narrow in other dimensions such as by inclining the side surfaces 134 inboard (e.g., as shown in FIG. 4) and/or reducing the height of the extension 106 in the direction towards the aft end 139 (e.g., as shown in FIGS. 1, 3, and 7). The aft extension 106 may be tapered differently such as by using curved (e.g., domed surfaces or otherwise contoured) surfaces such as to provide a generally streamlined structure extending aft of the transom 104 at a vertical location above the propulsors(s) 150. An aft extension 106 according to the present disclosure may provide certain advantages (e.g., reduce wake in a low freeboard mode at pre-planing speeds and/or access point near the transom of the watercraft), without negatively impacting performance in a second displacement configuration (e.g., in a high freeboard mode, for example when planing), because the aft extension 106 is positioned vertically such that the aft extension is substantially above the water in the second displacement configuration. As such, the presence of an aft extension 106 does not increase the wetted area and thus the drag of the watercraft's hull in the second displacement configuration. At the same time, in a low freeboard (e.g., semi-submerged) configuration, the tapered shape of the aft extension may improve the flow of water around the stern end of the watercraft (e.g., by aiding the water raveling around the stern of the watercraft to wrap inboard behind the transom following the shape of the extension), reducing the height, width and/or turbulence of the wake produced by the watercraft, which may allow the watercraft to be operated at higher speeds for an equivalent wake size produced by a watercraft with a transom stern.

Figure 11A:
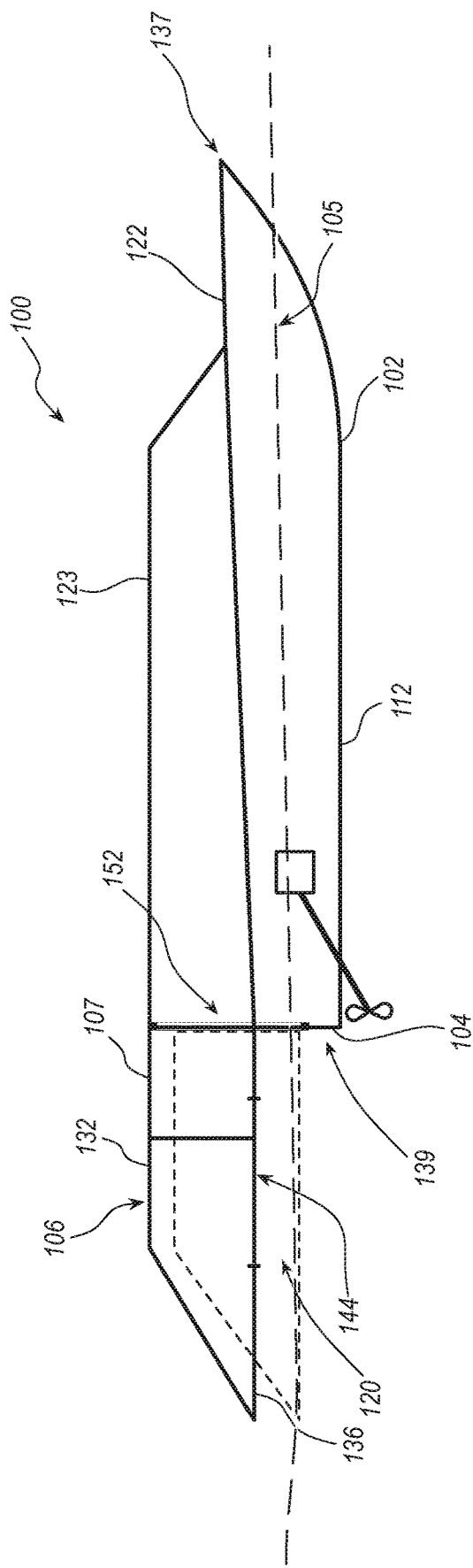
FIG. 11A is a simplified profile view of a watercraft with an aft extension according to some embodiments of the present disclosure.

In some embodiments, the watercraft 100 may be configured to selectively alter its wake using an aft extension movably coupled to the hull such that the aft extension can be articulated relative to the stern 139 end of the watercraft 100. In some embodiments, the aft extension may be articulated substantially vertically (e.g., translated up and down relative to the transom) to provide the aft extension in contact with and out of contact with the water. In some embodiments, the aft extension may be articulated by pivoting the aft extension about a pivot axis proximate the stern end of the watercraft, to provide the aft extension in contact with and out of contact with the water. In some embodiments, the aft extension may be both translated and pivoted to provide the aft extension in contact with and out of contact with the water, such as to lower and operatively position the aft extension with respect to the water. FIG. 11A shows an example of a watercraft 100 equipped with an aft extension 106 (e.g., structure 107) is movably coupled to the hull 102 of the watercraft 100 allowing the aft extension 106 (e.g., structure 107) to be articulated, in this case translated substantially vertically, toward and away from the water. The aft extension 106 (e.g., structure 107) may be operatively coupled to the rest of the watercraft 100, e.g., to hull 102 and/or superstructure 123, to enable the aft extension 107 to be moved and thus selectively repositioned into and out of contact with the water while the watercraft 100 is operating on the water without having to alter the displacement of the watercraft 100. As such, an articulating aft extension 106, as in the embodiment shown in FIG. 11A, may be suitable for use with a watercraft that is not a variable displacement watercraft. In some embodiments, an articulating aft extension 106 may be used also on a variable displacement watercraft, for example in instances in which available variable displacement alone may be insufficient to position the aft extension into contact with the water. In such instances, articulation may additionally be used to further displace the aft extension relative to the waterline 105 without further changes to the displacement of the watercraft. Any suitable actuation mechanism 152 for moving (e.g., translating substantially vertically and/or pivoting) the aft extension 106 relative to the watercraft's hull may be used including but not limited to one or more tracks, gears, pulleys, linkages, telescoping rods and any combinations thereof, which may be operatively associated with one or more lift motors powered by any suitable power source such as hydraulic, electric, or a pneumatic power source. In some examples, the aft extension 106 may include a first portion of a track system, which may be fixed to the structure 107, and operatively engaged with second portion of a track system connected to the hull 102 and/or superstructure 123, such that the structure 107 may be raised or lowered relative to the hull 102. The raising and lowering of the structure 107 may be powered (e.g., by a lift motor) or it may be powered or supplemented by manual force (e.g., through application of force by a crew member). In some examples, the track system may include a rack of gear teeth coupled to the structure 107, and a rotary gear coupled to the transom and having teeth adapted to mate with the teeth of the rack. The rotary gear may be actuated, either manually, or with an electric, pneumatic, hydraulic, or other type of rotary actuator that causes the gear to spin. As the gear spins, the mating of the teeth of the gear and the teeth of the rack may cause the structure 107 and/or the aft extension 106 to translate up or down relative to the hull 102, for example depending on the direction of motion of the rotary actuator. In other embodiments, the track may be mounted to the transom 104, while the rotary gear is mounted to the structure 107. In some embodiments, the structure 107 may be coupled to the hull 102 using one or more linkages configured to lower and raise the aft extension 106 relative to the keel line and thus into and out of the water. In yet other examples, one or more linear actuators may be used whereby one or more telescoping rods may be anchored to the main body of the watercraft (e.g., to the hull 102 and/or superstructure 123) and configured to be extended and retracted by one or more respective motors. Any suitable actuation mechanism 152 may be used. For example, the structure 107 may be operatively connected with an actuator such as a power screw, hydraulic or pneumatic piston, solenoid, or linear motor that translates and/or pivots the structure 107, or a portion thereof, relative to the hull 102 to operatively position the aft extension 106 for altering the wake of the watercraft or for stowage. In some embodiments, the structure 107 may be magnetically coupled to the hull 102, and either of the structure 107, aft extension 106, or the hull 102 may include movable magnetic elements that cause the structure 107 and/or the aft extension 106 to translate relative to the hull 102, or the aft extension to translate relative to the structure 107. Any suitable combinations of actuators, tracks, gears, pulleys, linkages and the like may be used.

Figure 11B:
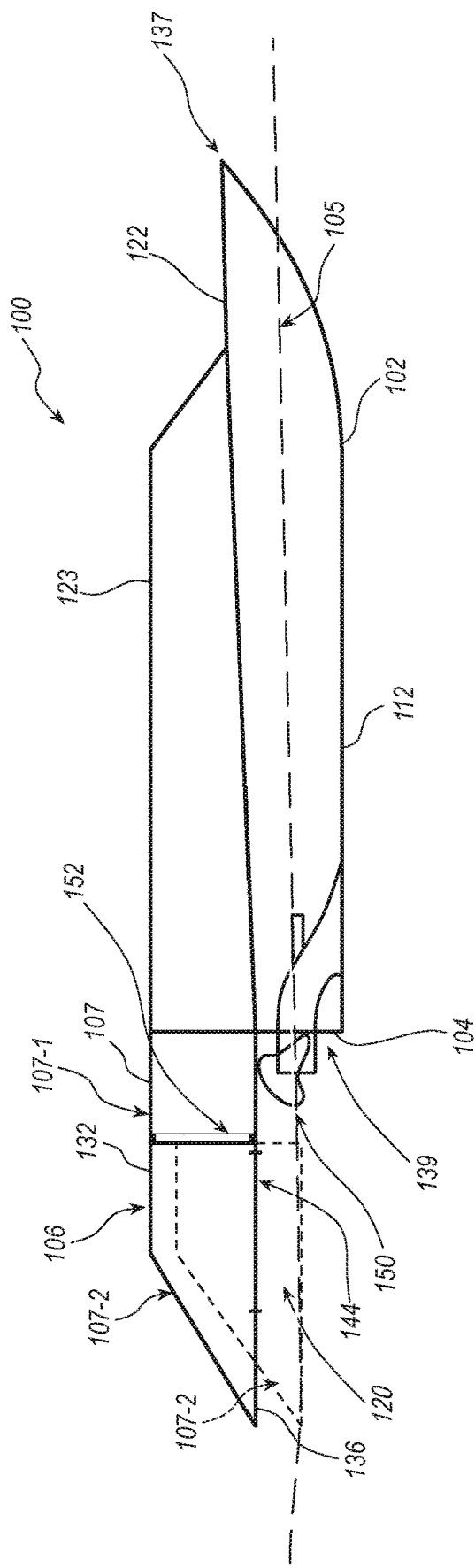
FIG. 11B is a simplified profile view of a watercraft with an aft extension according to further embodiments of the present disclosure.

In some embodiments, at least a portion of the aft extension 106 may be mounted such that it extends and remains, irrespective of the configuration of the watercraft, aft of any portion of the propulsor(s), which may be coupled to and extend from the transom. In some such examples, the aft extension 106 (e.g., structure 107) may include a first portion 107-1 that extends aft the transom and is positioned above (e.g., to overhang) an outboard portion of the propulsor(s), in the case of a transom-mounted propulsors(s). The structure 107 further includes a second portion 107-2 that is movably coupled to the first portion 107-1 of the aft extension such that the second portion 107-2 may be lowered and raised relative to the keel line 112, as shown in the example in FIG. 11B. The movable portion (e.g., second portion 107-2) of the aft extension may be configured to translate (e.g., substantially vertically as shown in FIG. 11B) and/or to pivot, such as about a transverse axis aft of the transom) in order to selectively position the aft extension into and out of contact with the water as the watercraft is re-configured between multiple operational configurations. Embodiments such as those shown in FIG. 11B may be appropriate for a watercraft with transom-mounted propulsors(s) so as to eliminate or reduce the risk of damage to any outboard portion of the transom-mounted propulsors(s).

Figure 12A:
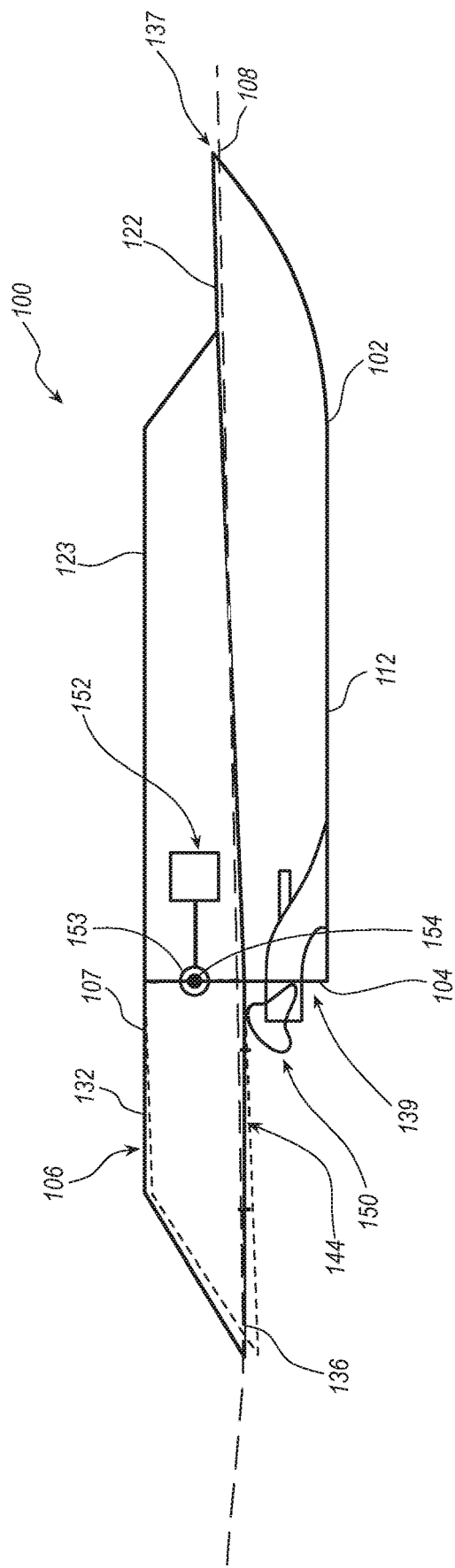
FIGS. 12A and 12B are simplified profile views of a watercraft having an aft extension according to some embodiments of the present disclosure, shown in one or more deployed configurations and in a stowed configuration, respectively.

In some embodiments, the structure 107, or a portion thereof, may be rotatable relative to the hull 102, as shown for example in FIG. 12A. In FIG. 12A, the structure 107 is configured to pivot about a pivot axis 154, which in this example is arranged substantially transversely or perpendicularly to the longitudinal direction. The pivot axis 154 may be located at any suitable elevation relative to the keel line 112 of the watercraft, for instance at a location substantially at the elevation of the deck 122, or a location vertically above the weather deck 122, such as about mid-way between the weather deck and the top of the superstructure 123.

Depending on the actuation mechanism used, the pivot axis 154 may be located elsewhere, for example at or closer to the top of the superstructure 123. In some embodiments, the aft extension 106 may be pivotable to a position in which the underside of the aft extension 106 is inclined to a horizontal plane, for example, to lower a portion of the aft extension, such as a portion including an access opening (e.g., a hatch of a moonpool) closer to the water.

The rotation of the structure 107 about the pivot axis 154 may be achieved manually, by a lift motor 153, or a combination of the two where the lift motor 153 provides lift assistance to a manual operation of the actuation mechanism 152. In various embodiments, the actuation mechanism 152 may include a rotary actuator such as an electric, hydraulic, or pneumatic motor. In other embodiments, the actuation mechanism 152 may include one or more elongate flexible members that attach to a portion of the structure 107 and extend or retract to raise or lower the structure 107. For example, an elongate flexible member may be a chain, strap, rope, cable, or the like. In some embodiments, the structure 107 may be biased by a biasing member to rotate preferentially in a direction about the pivot axis 154. For example, a biasing element such as a rotary spring may bias the structure 107 upward preferentially, while one or more elongate flexible members may oppose the rotation of the biasing element and can overcome the bias to rotate the structure 107 downward, as desired. Other embodiments are envisioned in which the structure 107 are translatable and rotatable relative to fixed portions of the watercraft 100.

The various embodiments of structures 107 which are moveable (e.g., translatable as in the examples in FIGS. 11A/B, pivotable as in the examples in FIGS. 12A/B, or both) may provide the wake altering benefits of an aft extension 106 described herein irrespective of whether the watercraft is configured as a variable displacement watercraft. In some examples, the watercraft may not be a variable displacement craft, and as the watercraft takes on more or less weight (e.g., cargo or passengers), its freeboard may increase or decrease. An aft extension 106 may be moveably coupled to reposition the aft extension 106 relative to the water in response to these changes. Even in instances where the watercraft is a variable displacement (or variable freeboard) watercraft, a moveable aft extension may be used operatively to position the aft extension with respect to the water in instances where changing the displacement of the watercraft 100 may not be desirable and/or in instances in which it may be desirable to position the aft extension outside of the limits of longitudinal CG control of the watercraft.

In some embodiments, a moveable aft extension 106 may enable the operator of the watercraft 100 to dynamically adjust the vertical position of the aft extension responsive to the operation of the watercraft. The dynamic adjustments may be manual or automatic (e.g., via an electronic system that communicates with the actuation mechanism 152 and the watercraft's navigation and control system). The aft extension 106 may be configured to move between the deployed and stowed position based on the speed of the watercraft, or the wake generated thereby. For example, as a watercraft 100 transitions from operating at lower speed (e.g., displacement mode) to a higher speed (e.g., planing mode), the aft extension 106 may be automatically raised as the speed of the watercraft increases and/or as the bow of the watercraft pitches up to ensure that the aft extension 106 is out of the water as the watercraft transitions to plane and operating at high speed. Likewise, as the watercraft transitions from a high speed to a lower speed, the aft extension 106 may be automatically and dynamically positioned (e.g., deployed from a stowed position such as pivoting the aft extension 106 or adjusting its vertical position) to a position in which the aft extension 106 is at or below the waterline.

A moveable aft extension 106 may provide the further advantage of being able to move an access opening 144, if so equipped, close to the water regardless of the whether the watercraft 100 is configured for variable freeboard. For example, if the access opening 144 is used as a moon pool, the aft extension 106 may be moved (e.g., translated or rotated) relative to the waterline to enable the deployment or retrieval of a payload such as personnel or equipment below the waterline without significant impact on observability.

Figure 12B:
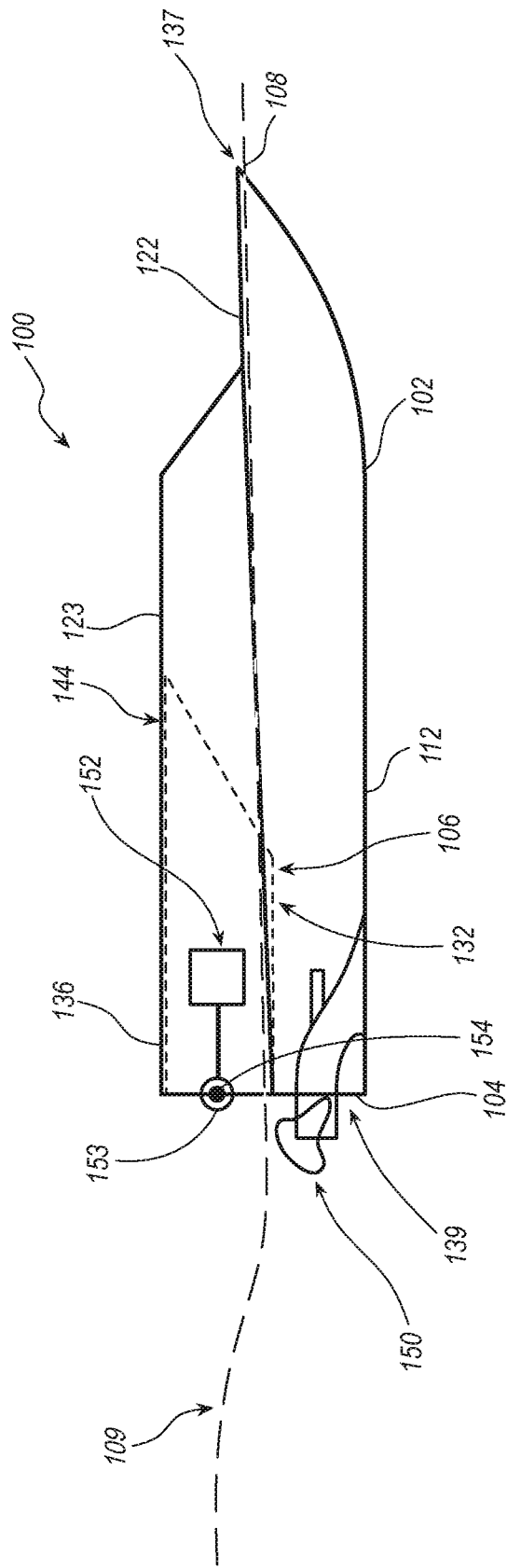

In some embodiments, an aft extension 106 may be moveable between a deployed position, which may be any position in which the aft extension 106 is operatively positioned with respect to the waterline as shown in solid line and in dashed line in FIG. 12A, and a storage or stowed position, for example as shown in FIG. 12B. In some embodiments, the aft extension 106 may be rotatable to the storage position, as in the example in FIG. 129. The aft extension 106 may be nested inside the hull 102 and/or the superstructure 123 in the storage position, which may conceal the structure 107 within the enclosed profile of the watercraft 100 when not in use. In some embodiments, the aft extension 106 may only partially nest or be concealed, or not at all, within the enclosed profile of the watercraft 100. In some embodiments, the aft extension 106 may be differently articulated to a concealed position, which may additionally or alternatively to pivoting, involve translating (e.g., longitudinally) the aft extension, optionally with mechanical actuation or lift assist, to position the aft extension 106 forward of the transom.

Various examples of the present disclosure have been described in detail above to facilitate an understanding of the invention. It will be recognized by those skilled in the art that many variations to the examples described are possible without departing from the scope and spirit of the invention disclosed herein, and that the scope of the claimed invention is defined by the claims listed below. The terms "including" and "having" as used in the specification and claims shall have the same meaning as the term "comprising."

What is claimed is:

1. A watercraft comprising:
    a hull extending from a bow to a stern of the watercraft, wherein the stern comprises a transom; and
    an aft extension coupled to the hull to extend aft of the transom, wherein the aft extension comprises aftward-tapering side outer surfaces that are substantially flat and converge to meet at the stern; and
    wherein the aft extension has a bottom side offset vertically from a keel of the watercraft such that the bottom side is located above a waterline of the watercraft when the watercraft is operated in a waterway in a first configuration whereby a wake is formed by the hull, and wherein the bottom side is located at or below the waterline when the watercraft is operated in a second configuration such that the aft extension reduces the wake when the watercraft is operated in the second configuration.

2. The watercraft of claim 1, wherein:
    the first configuration is a first freeboard configuration associated with a first waterline and the second configuration is a second freeboard configuration associated with a second waterline higher than the first waterline; and the watercraft is a variable displacement watercraft having an internal ballast system comprising at least one ballast tank within a hull cavity for selectively varying a displacement of the hull between the first freeboard configuration, in which the hull displaces a first amount of water, and the second freeboard configuration, in which the hull displaces a second amount of water greater than the first amount of water.

3. The watercraft of claim 2, wherein the aft extension is fixed to the hull.

4. The watercraft of claim 1, further comprising a deck enclosing at least a portion of a hull cavity, and a superstructure extending above the deck, wherein the aft extension is coupled to the hull such that it extends the superstructure to a location aft of the transom.

5. The watercraft of claim 4, wherein the aft extension defines a passage connecting the interior of the aft extension to an interior of the superstructure, the passage being sufficiently large to accommodate passage of personnel or payload therethrough.

6. The watercraft of claim 1, wherein the bottom side is substantially flat.

7. The watercraft of claim 1, wherein the bottom side of the aft extension defines an opening, which provides access into or out of the aft extension, and which is configured to be sealed when the watercraft is in the second configuration.

8. The watercraft of claim 7, further comprising a hatch operatively associated with the opening to selectively seal the opening.

9. The watercraft of claim 8, wherein the hatch opens from an interior of the aft extension.

10. The watercraft of claim 9, wherein the hatch opens and closes by moving in a direction substantially parallel to the bottom side of the aft extension.

11. The watercraft of claim 7, wherein the bottom side of the aft extension is vertically offset to a location above a propulsor of the watercraft, and wherein the opening is arranged longitudinally along the bottom side such that the opening is aft of the propulsor.

12. The watercraft of claim 1, wherein the aft extension is configured to alter the wake of the hull when the watercraft is in the second configuration.

13. The watercraft of claim 12, wherein a height of the aft extension decreases aft of the transom.

14. The watercraft of claim 13, wherein one or more outer surfaces of the aft extension are inclined inboard.

15. The watercraft of claim 1, wherein the aft extension is moveably coupled to the hull whereby the aft extension is movable between a first position when the watercraft is in the first configuration and a second position when the watercraft is in the second configuration.

16. The watercraft of claim 15, wherein the aft extension is moveable substantially vertically to reposition the aft extension between the first and second positions.

17. The watercraft of claim 15, wherein the aft extension is pivotable to reposition the aft extension between the first and second positions.

18. The watercraft of claim 17, wherein the first position is a stowed position in which the aft extension is positioned substantially forward of the transom and the second position is a deployed position in which the aft extension is positioned to extend substantially aft of the transom, and wherein the aft extension is pivotable about a substantially transverse axis to move the aft extension between the deployed and stowed positions.

19. The watercraft of claim 15, further comprising an actuator configured to move the aft extension between the first and second positions.

20. The watercraft of claim 1, wherein the hull is a planing hull and wherein a length of the aft extension is selected such that the aft extension remains above water when the watercraft is planing.

21. A variable displacement marine vessel comprising:
a hull defining a hull cavity, the hull comprising a transom;
a weather deck enclosing at least a portion of the hull cavity;
a rear deck coupled to the hull and extending aft of the transom, the rear deck narrowing in a direction aft of the transom;
an aft enclosure that substantially encloses the rear deck and forms part of a superstructure of the vessel, the aft enclosure being sized to accommodate a passage of a person therethrough, wherein a bottom surface of the aft enclosure encloses an underside of the rear deck; and
a ballast system that selectively varies an amount of ballast within the hull cavity to vary a displacement of the hull between a first displacement configuration associated with a first waterline located below the bottom surface of the aft enclosure and a second displacement configuration associated with a second waterline located at or above the bottom surface of the aft enclosure.

22. The marine vessel of claim 21, wherein the rear deck is at substantially a same elevation as a stern end of the weather deck.

23. The marine vessel of claim 21, wherein an upper surface of the rear deck is coplanar with an upper surface of a stern end of the weather deck.

24. The marine vessel of claim 21, further comprising a propulsor having an external portion that extends aft of the transom, and wherein the rear deck extends aft of the external portion of the propulsor.

25. The marine vessel of claim 24, further comprising an access hatch coupled to the rear deck to selectively open and close an opening through the underside of the rear deck.

26. The marine vessel of claim 25, wherein at least a portion of the opening is located aft of the external portion of the propulsor.

27. The marine vessel of claim 25, wherein the access hatch opens from inside the aft enclosure.

28. A watercraft comprising:
a hull extending from a bow to a stern of the watercraft, wherein the stern comprises a transom; and
an aft extension coupled to the hull to extend aft of the transom, wherein the aft extension has a bottom side offset vertically from a keel of the watercraft such that the bottom side is located above a waterline of the watercraft when the watercraft is operated in a waterway in a first configuration whereby a wake is formed by the hull, and wherein the bottom side is located at or below the waterline when the watercraft is operated in a second configuration such that the aft extension reduces the wake when the watercraft is operated in the second configuration;
wherein the aft extension is movably coupled to the hull whereby the aft extension is movable between a first position when the watercraft is in the first configuration and a second position when the watercraft is in the second configuration;

wherein the aft extension is pivotable to reposition the aft extension between the first and second positions; and wherein the first position is a stowed position in which the aft extension is positioned substantially forward of the transom and the second position is a deployed position in which the aft extension is positioned to extend substantially aft of the transom, and wherein the aft extension is pivotable about a substantially transverse axis to move the aft extension between the deployed and stowed positions.

\* \* \* \* \*